(12) United States Patent
Alakuijala et al.

(10) Patent No.: US 11,070,808 B2
(45) Date of Patent: *Jul. 20, 2021

(54) SPATIALLY ADAPTIVE QUANTIZATION-AWARE DEBLOCKING FILTER

(71) Applicant: GOOGLE LLC, Mountain View, CA (US)

(72) Inventors: Jyrki Alakuijala, Wollerau (CH); Jan Wassenberg, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,719

(22) Filed: Nov. 19, 2019

(65) Prior Publication Data

US 2020/0092558 A1 Mar. 19, 2020

Related U.S. Application Data

(63) Continuation of application No. 15/952,300, filed on Apr. 13, 2018, now Pat. No. 10,491,897.

(51) Int. Cl.
*H04N 19/124* (2014.01)
*H04N 19/172* (2014.01)
(Continued)

(52) U.S. Cl.
CPC ......... *H04N 19/124* (2014.11); *H04N 19/172* (2014.11); *H04N 19/44* (2014.11);
(Continued)

(58) Field of Classification Search
None
See application file for complete search history.

(56) References Cited

U.S. PATENT DOCUMENTS 5,253,075 A * 10/1993 Sugiyama ............ H04N 19/176
382/239
8,761,247 B2 6/2014 Bock et al.
(Continued)

FOREIGN PATENT DOCUMENTS

WO 2008057308 A2 5/2008
WO 2013063113 A1 5/2013
WO 2014043516 A1 3/2014

OTHER PUBLICATIONS

Bankoski, et al., "Technical Overview of VP8, An Open Source Video Codec for the Web", Jul. 11, 2011, 6 pp.
Bankoski et al, "VP8 Data Format and Decoding Guide", Independent Submission RFC 6389, Nov. 2011, 305 pp.
Bankoski et al, "VP8 Data Format and Decoding Guide draft-bankoski-vp8-bitstream-02", Network Working Group, Internet-Draft, May 18, 2011, 288 pp.
(Continued)

*Primary Examiner* — Reza Aghevli
(74) *Attorney, Agent, or Firm* — Young Basile Hanlon & MacFarlane, P.C.

(57) ABSTRACT

A spatially adaptive quantization-aware deblocking filter is used for encoding or decoding video or image frames. The deblocking filter receives a reconstructed frame produced based on dequantized and inverse transformed coefficients of a video frame or an image frame. The reconstructed frame is filtered according to adaptive quantization field data for the video or image frame. The adaptive quantization field data represents weights applied to quantization values used at different areas of the video or image frame. A number of blocking artifacts remaining within the resulting filtered frame is determined. The adaptive quantization field data is then adjusted based on that number of blocking artifacts. The filtered frame is then filtered according to the adjusted adaptive quantization field data. The resulting re-filtered frame is then output to an output source, such as for transmission, display, storage, or further processing.

20 Claims, 10 Drawing Sheets

(51) Int. Cl.
  *H04N 19/44* (2014.01)
  *H04N 19/70* (2014.01)
  *H04N 19/80* (2014.01)
  *H04N 19/176* (2014.01)
  *H04N 19/186* (2014.01)
(52) U.S. Cl.
  CPC ............ *H04N 19/70* (2014.11); *H04N 19/80* (2014.11); *H04N 19/176* (2014.11); *H04N 19/186* (2014.11)

(56) References Cited

U.S. PATENT DOCUMENTS

| | | | |
|---|---|---|---|
| 8,885,706 B2* | 11/2014 | Bankoski | H04N 19/124 375/240.03 |
| 8,897,591 B2* | 11/2014 | Wilkins | H04N 19/513 382/268 |
| 9,131,073 B1* | 9/2015 | Bankoski | H04N 7/00 |
| 9,135,724 B2 | 9/2015 | Sato | |
| 9,161,046 B2 | 10/2015 | Van der Auwera et al. | |
| 9,253,483 B2* | 2/2016 | Lou | H04N 19/124 |
| 9,344,729 B1* | 5/2016 | Grange | H04N 19/117 |
| 9,438,906 B2 | 9/2016 | Lim et al. | |
| 9,495,765 B2 | 11/2016 | Sato | |
| 9,510,019 B2 | 11/2016 | Gu et al. | |
| 9,787,993 B2 | 10/2017 | Lim et al. | |
| 9,794,566 B2 | 10/2017 | Sato | |
| 9,854,243 B2 | 12/2017 | Sato | |
| 10,070,138 B2 | 9/2018 | Lim et al. | |
| 10,102,613 B2* | 10/2018 | Kopp | H04N 19/117 |
| 10,171,804 B1* | 1/2019 | Wang | H04N 19/172 |
| 10,194,152 B2 | 1/2019 | Sato | |
| 10,212,423 B2 | 2/2019 | Sato | |
| 10,491,897 B2* | 11/2019 | Alakuijala | H04N 19/124 |
| 2011/0222597 A1 | 9/2011 | Xu et al. | |
| 2012/0288213 A1 | 11/2012 | Amon et al. | |
| 2013/0101027 A1 | 4/2013 | Narroschke et al. | |
| 2013/0101031 A1 | 4/2013 | Van der Auwera et al. | |
| 2013/0114695 A1 | 5/2013 | Joshi et al. | |
| 2014/0079135 A1 | 3/2014 | Van der Auwera et al. | |
| 2014/0153647 A1 | 6/2014 | Nakamura et al. | |
| 2014/0198846 A1 | 7/2014 | Guo et al. | |
| 2014/0219356 A1 | 8/2014 | Nishitani et al. | |
| 2014/0247875 A1 | 9/2014 | Hattori et al. | |
| 2014/0286402 A1 | 9/2014 | Nishitani et al. | |
| 2014/0286403 A1 | 9/2014 | Nishitani et al. | |
| 2014/0328387 A1 | 11/2014 | Puri et al. | |
| 2014/0348240 A1 | 11/2014 | Kim et al. | |
| 2014/0376621 A1 | 12/2014 | Fukushima et al. | |
| 2015/0023405 A1 | 1/2015 | Joshi et al. | |
| 2015/0373328 A1* | 12/2015 | Yenneti | H04N 19/12 375/240.03 |
| 2016/0100166 A1 | 4/2016 | Dragne et al. | |
| 2016/0156926 A1 | 6/2016 | Hashimoto et al. | |
| 2016/0277760 A1 | 9/2016 | Li et al. | |
| 2017/0180737 A1 | 6/2017 | Ye et al. | |
| 2017/0302965 A1 | 10/2017 | Xu et al. | |
| 2018/0020241 A1 | 1/2018 | Li et al. | |

OTHER PUBLICATIONS

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion of International Patent Application No. PCT/US2019/026511 dated Jul. 4, 2019; pp. 1-14.

List et al.; "Adaptive Deblocking Filter"; IEEE Transactions on Circuits and Systems for Video Technology, Institute of Electrical and Electronics Engineers, Jul. 1, 2003; pp. 614-619.

Norkin et al.; "HEVC Deblocking Filter"; IEE Transactions on Circuits and Systems for Video Technology, Institute of Electrical and Alectronics Engineers; Dec. 1, 2012; pp. 1746-1754.

\* cited by examiner

SPATIALLY ADAPTIVE QUANTIZATION-AWARE DEBLOCKING FILTER

CROSS-REFERENCE TO RELATED APPLICATION(S)

This disclosure is a continuation of U.S. patent application Ser. No. 15/952,300, filed Apr. 13, 2018, the disclosure of which is incorporated by reference herein in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

The approaches for reducing the amount of data in video streams may also be used to reduce the amount of data in an image. Image content represents a significant amount of online content. A web page may include multiple images, and a large portion of the time and resources spent rendering the web page are dedicated to rendering those images for display. The amount of time and resources required to receive and render an image for display depends in part on the manner in which the image is compressed. As such, an image, and therefore a web page that includes the image, can be rendered faster by reducing the total data size of the image using encoding and decoding techniques.

SUMMARY

Disclosed herein are, inter alia, systems and techniques for video or image coding using a spatially adaptive quantization-aware deblocking filter.

A method for decoding an encoded frame according to an implementation of this disclosure comprises decoding, from a bitstream to which the encoded frame is encoded, syntax data, quantized transform coefficients of encoded blocks of the encoded frame and adaptive quantization field data used to encode the encoded blocks. A reconstructed frame is produced, including by dequantizing and inverse transforming the quantized transform coefficients. A filtered frame is produced based on the reconstructed frame, including by modulating, according to the adaptive quantization field data, one or more of a non-linearity selection filter parameter, a filter size parameter, or a directional sensitivity filter parameter. The filtered frame is output for storage or display.

A method for decoding an encoded frame according to an implementation of this disclosure comprises receiving an encoded frame and adaptive quantization field data used to encode the encoded frame. A reconstructed frame is produced using the encoded frame and the adaptive quantization field data. One or more of a non-linearity selection filter parameter, a filter size parameter, or a directional sensitivity filter parameter available for filtering the reconstructed frame is or are changed based on the adaptive quantization field data. Filtered data is produced by filtering the reconstructed frame according to the adaptive quantization field data and using the changed one or more of the non-linearity selection filter parameter, the filter size parameter, or the directional sensitivity filter parameter. The method then comprises determining whether a number of blocking artifacts within the filtered data exceeds a threshold. Responsive to determining that the number of blocking artifacts within the filtered data exceeds the threshold, at least some of the adaptive quantization field data is adjusted. A filtered frame is produced by re-filtering the reconstructed frame according to the adjusted adaptive quantization field data.

A method for decoding an encoded frame according to an implementation of this disclosure comprises producing a reconstructed frame from the encoded frame according to adaptive quantization field data used to encode one or more blocks of the encoded frame. The adaptive quantization field data is adjusted according to one or more details within the reconstructed frame. A filtering of the reconstructed frame is controlled using the adjusted adaptive quantization field data.

These and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Lossy encoding involves reducing the amount of data within an image or a video to be encoded, such as using quantization. In exchange for a decreased bit cost of the resulting encoded image or video, the image suffers certain quality loss. The extent of the quality loss depends largely upon the manner by which the image data or the video data was quantized during the encoding. In particular, the quantization of image data or video data can result in discontinuities along block boundaries, such as blocking artifacts. The quantization error resulting from lossy encoding is typically indicative of the amount of blocking artifacts resulting from the encoding. As such, the greater the quantization error, the greater the number of blocking artifacts, and, therefore, the greater the quality loss.

Blocking artifacts may be reduced by applying a filter, such as a deblocking filter, to the coefficients of a video block or of an image block. The deblocking filter may be applied to a reconstructed frame or a portion of a reconstructed frame at the end of a reconstructing phase in the encoding process or at the end of the decoding process. The deblocking filter removes blocking artifacts from a frame to reproduce that frame in its pre-encoded form. However, a typical deblocking filter does not have visibility into the amount of quantization that was used to encode a given frame or the specific blocks therein. As such, and particularly where different quantization levels are used for different blocks within a single frame, the deblocking filter may use a suboptimal or inappropriate filtering strength or filter radius size.

Implementations of this disclosure address problems such as these using a deblocking filter controlled based on adaptive quantization field data. The adaptive quantization field data is used to control the strength and spatial size of the deblocking filter. As such, the deblocking filter uses a greater strength and/or spatial size for blocks that the adaptive quantization field data indicates were encoded at a greater quantization level and a lesser strength and/or spatial size for blocks that the adaptive quantization field data indicates were encoded at a lesser quantization level. Fine details within a frame are preserved by controlling the strength and spatial size of the filtering based on the adaptive quantization field data. A psychovisual model is used in connection with the filtering to determine whether adjustments should be made to the adaptive quantization field data. For example, if a number of blocking artifacts remaining within an area of the frame to encode or decode is too large, the psychovisual model can indicate to increase vales of the adaptive quantization field data for that area.

Figure 1:
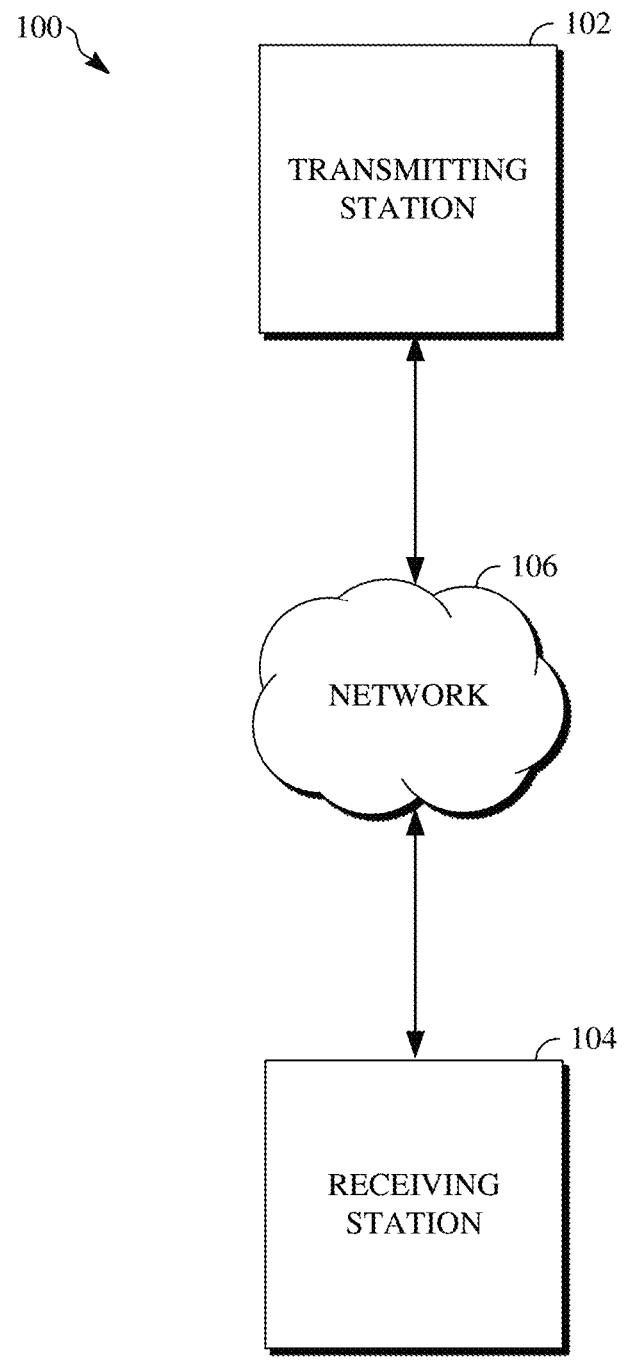
FIG. 1 is a schematic of an example of an encoding and decoding system.

Further details of techniques for video or image coding using a spatially adaptive quantization-aware deblocking filter are described herein with initial reference to a system in which they can be implemented. FIG. 1 is a schematic of an example of an encoding and decoding system 100. The encoding and decoding system 100 includes a transmitting station 102, a receiving station 104, and a network 106.

The transmitting station 102 is a computing device that encodes and transmits a video or an image. Alternatively, the transmitting station 102 may include two or more distributed computing devices for encoding and transmitting a video or an image. The receiving station 104 is a computing device that receives and decodes an encoded video or an encoded image. Alternatively, the receiving station 104 may include two or more distributed computing devices for receiving and decoding an encoded video or an encoded image. An example of a computing device used to implement one or both of the transmitting station 102 or the receiving station 104 is described below with respect to FIG. 2.

The network 106 connects the transmitting station 102 and the receiving station 104 for the encoding, transmission, receipt, and decoding of a video or an image. The network 106 can be, for example, the Internet. The network 106 can also be a local area network, a wide area network, a virtual private network, a cellular telephone network, or another means of transferring the video or the image from the transmitting station 102 to the receiving station 104.

Implementations of the encoding and decoding system 100 may differ from what is shown and described with respect to FIG. 1. In some implementations, the encoding and decoding system 100 can omit the network 106. In some implementations, a video or an image can be encoded and then stored for transmission at a later time to the receiving station 104 or another device having memory. In some implementations, the receiving station 104 can receive (e.g., via the network 106, a computer bus, and/or some communication pathway) the encoded video or encoded image and store the encoded video or encoded image for later decoding.

In some implementations, the functionality of the transmitting station 102 and of the receiving station 104 can change based on the particular operations performed. For example, during operations for encoding a video or an image, the transmitting station 102 can be a computing device used to upload the video or the image to be encoded to a server, and the receiving station 104 can be the server that receives the video or the image from the transmitting station 102 and encodes the video or the image for later use (e.g., in storing a bitstream, rendering a webpage, or the like).

In another example, during operations for decoding an encoded video or encoded image, the transmitting station 102 can be a server that decodes the encoded video or encoded image, and the receiving station 104 can be a computing device that receives the decoded video or decoded image from the transmitting station 102 and outputs or renders the decoded video or decoded image (e.g., to an output video stream, as part of a webpage, or the like).

In some implementations, the encoding and decoding system 100 may omit the network 106. In some implementations, a transport protocol may be used to transport a video or an image, or an encoded video or encoded image, over the network 106. For example, the transport protocol may be the real-time transport protocol, the hypertext transfer protocol, or another image or video streaming protocol.

In some implementations, each of the transmitting station 102 and the receiving station 104 may include functionality for both encoding and decoding a video or an image. For example, the encoding and decoding system 100 may be implemented using a video conferencing system. The receiving station 104 may be a computing device of a video conference participant. The receiving station 104 may receive an encoded video bitstream from a video conference server (e.g., the transmitting station 102) to decode and view. The receiving station 104 may further encode and transmit another video bitstream to the video conference server, such as for decoding and viewing by computing devices of other video conference participants.

Figure 2:
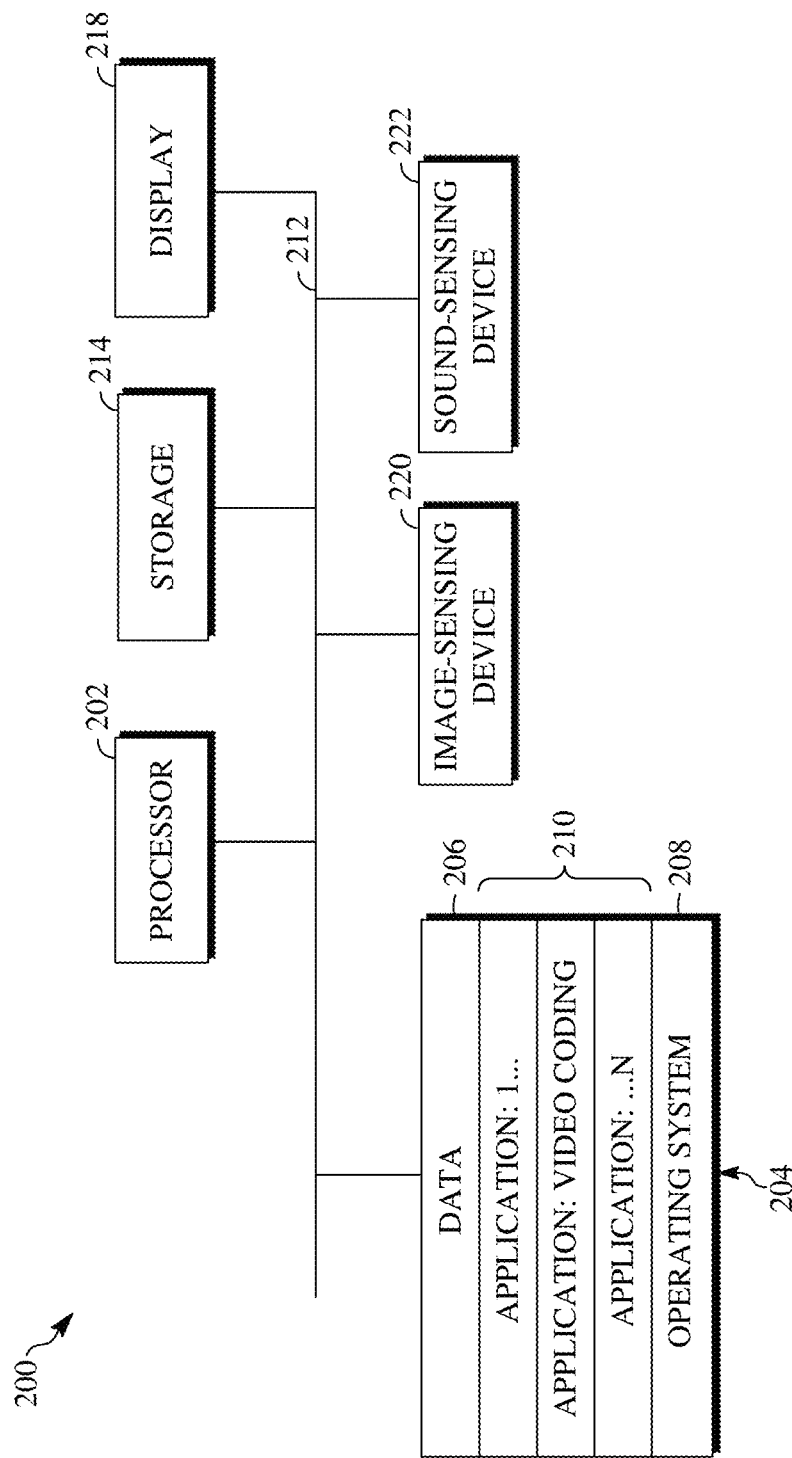
FIG. 2 is a block diagram of an example of a computing device that can implement a transmitting station or a receiving station of an encoding and decoding system.

FIG. 2 is a block diagram of an example of a computing device 200 that can implement a transmitting station or a receiving station of an encoding and decoding system, such as the encoding and decoding system 100 shown in FIG. 1. For example, the computing device 200 can implement one or both of the transmitting station 102 or the receiving station 104 shown in FIG. 1. The computing device 200 can be in the form of a computing system including multiple computing devices or in the form of one computing device. For example, the computing device 200 can be one of a mobile phone, a tablet computer, a laptop computer, a notebook computer, a desktop computer, a server computer, a game console, a wearable device, or the like.

A processor 202 in the computing device 200 can be a conventional central processing unit. Alternatively, the processor 202 can be another type of device, or multiple devices, now existing or hereafter developed, capable of manipulating or processing information. For example, although the disclosed implementations can be practiced with one processor as shown (e.g., the processor 202), advantages in speed and efficiency can be achieved by using more than one processor.

A memory 204 in the computing device 200 can be a read-only memory device or a random-access memory device in an implementation. However, other suitable types of storage devices can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include video or image coding software that performs some or all of the techniques described herein. The computing device 200 can also include a secondary storage 214, which can, for example, be a memory card used with a mobile computing device. For example, an image can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including as a liquid crystal display, a cathode-ray tube display, or a light emitting diode display, such as an organic light emitting diode display.

The computing device 200 can also include or be in communication with an image-sensing device 220, for example, a camera, or another image-sensing device, now existing or hereafter developed, which can sense an image such as the image of a user operating the computing device 200. The image-sensing device 220 can be positioned such that it is directed toward the user operating the computing device 200. For example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or another sound-sensing device, now existing or hereafter developed, which can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Implementations of the computing device 200 may differ from what is shown and described with respect to FIG. 2. In some implementations, the operations of the processor 202 can be distributed across multiple machines (wherein individual machines can have one or more processors) that can be coupled directly or across a local area or other network. In some implementations, the memory 204 can be distributed across multiple machines, such as a network-based memory or memory in multiple machines performing the operations of the computing device 200. In some implementations, the bus 212 of the computing device 200 can be composed of multiple buses. In some implementations, the secondary storage 214 can be directly coupled to the other components of the computing device 200 or can be accessed via a network and can comprise an integrated unit, such as a memory card, or multiple units, such as multiple memory cards.

Figure 3A:
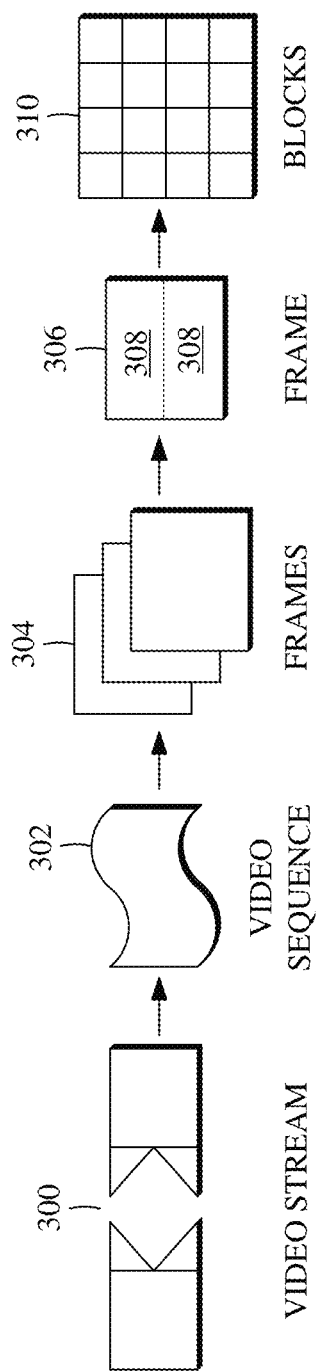
FIG. 3A is a diagram of an example of a video stream to be encoded and subsequently decoded.

FIG. 3A is a diagram of an example of a video stream 300 to be encoded and subsequently decoded. The video stream 300 represents a typical video stream that can be encoded into a compressed bitstream, for example, using the transmitting station 102 shown in FIG. 1, and subsequently decoded into an output video stream, for example, using the receiving station 104 shown in FIG. 1.

The video stream 300 includes a video sequence 302. At the next level, the video sequence 302 includes a number of adjacent frames 304. While three frames are depicted as the adjacent frames 304, the video sequence 302 can include another number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 3B:
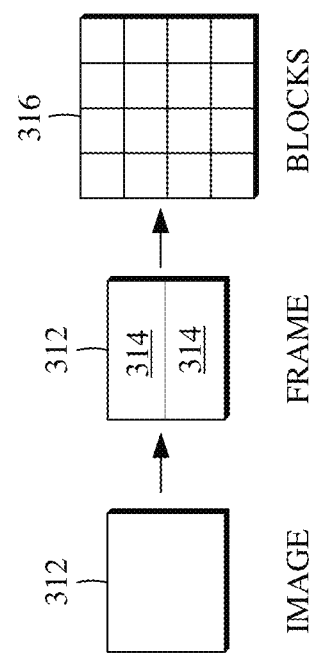
FIG. 3B is a diagram of an example of an image to be encoded and subsequently decoded.

FIG. 3B is a diagram of an example of an image frame 312 to be encoded and subsequently decoded. The image frame 312 represents a typical image that can be encoded into a compressed bitstream or storage, for example, using the transmitting station 102 shown in FIG. 1, and subsequently decoded for rendering at a display, for example, using the receiving station 104 shown in FIG. 1. The image frame 312 may have the same form as the frame 306 shown in FIG. 3A. For example, the image frame 312 may be divided into the image segments 314 and/or the image blocks 316 for further processing during encoding or decoding.

Figure 4:
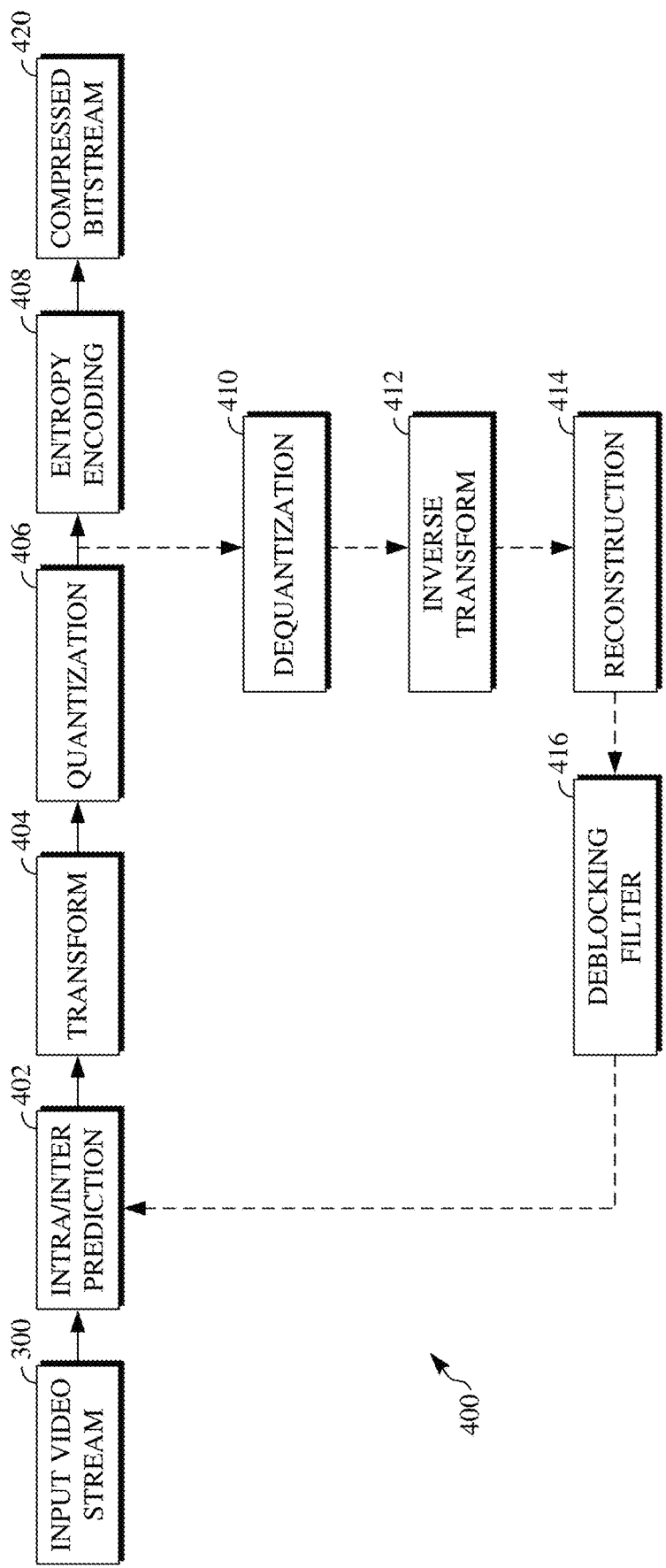
FIG. 4 is a block diagram of an example of an encoder.

FIG. 4 is a block diagram of an encoder 400. The encoder 400 can be implemented, as described above, in the transmitting station 102 shown in FIG. 1, such as by providing a computer software program stored in memory, for example, the memory 204 shown in FIG. 2. The computer software program can include machine instructions that, when executed by a processor such as the processor 202 shown in FIG. 2, cause the transmitting station 102 to encode video data in the manner described in FIG. 4. The encoder 400 can also be implemented as specialized hardware (e.g., an integrated circuit) included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408.

The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a deblocking filter stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual or prediction residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The deblocking filter stage 416 can be applied to the reconstructed block to reduce distortion such as blocking artifacts. Implementations and examples of a deblocking filter used at the deblocking filter stage 416 are described below with respect to FIG. 6.

Implementations of the encoder 400 may differ from what is shown and described with respect to FIG. 4. In particular, the encoder 400 as shown in FIG. 4 is an example of an encoder for encoding video data, such as a video frame or a video block. However, in other implementations, the encoder 400 may be an example of an encoder for encoding image data, such as an image frame or an image block.

In such an implementation, the encoder 400 omits the intra/inter prediction stage 402. For example, the input image data is first processed at the transform stage 404 and then the quantization stage 406 before it enters the reconstruction path of stages 410, 412, 414, and 416. The output of the deblocking filter stage 416 can be sent to the transform stage 404 for further processing. If the reconstruction path is not needed, such as because the error level for the image frame meets a threshold, the reconstruction path may not be followed and the quantized image data may instead proceed to the entropy encoding stage 408 and then output to the compressed bitstream 420. In some implementations where the encoder 400 is used to encode image data, the encoder 400 may omit the entropy encoding stage 408.

In some implementations, the encoder 400 may be a non-transform based encoder for image or video coding. In such an implementation, the encoder 400 can quantize the residual signal directly without the transform stage 404 for certain blocks or frames. In some implementations, the quantization stage 406 and the dequantization stage 410 may be combined into a common stage.

Figure 5:
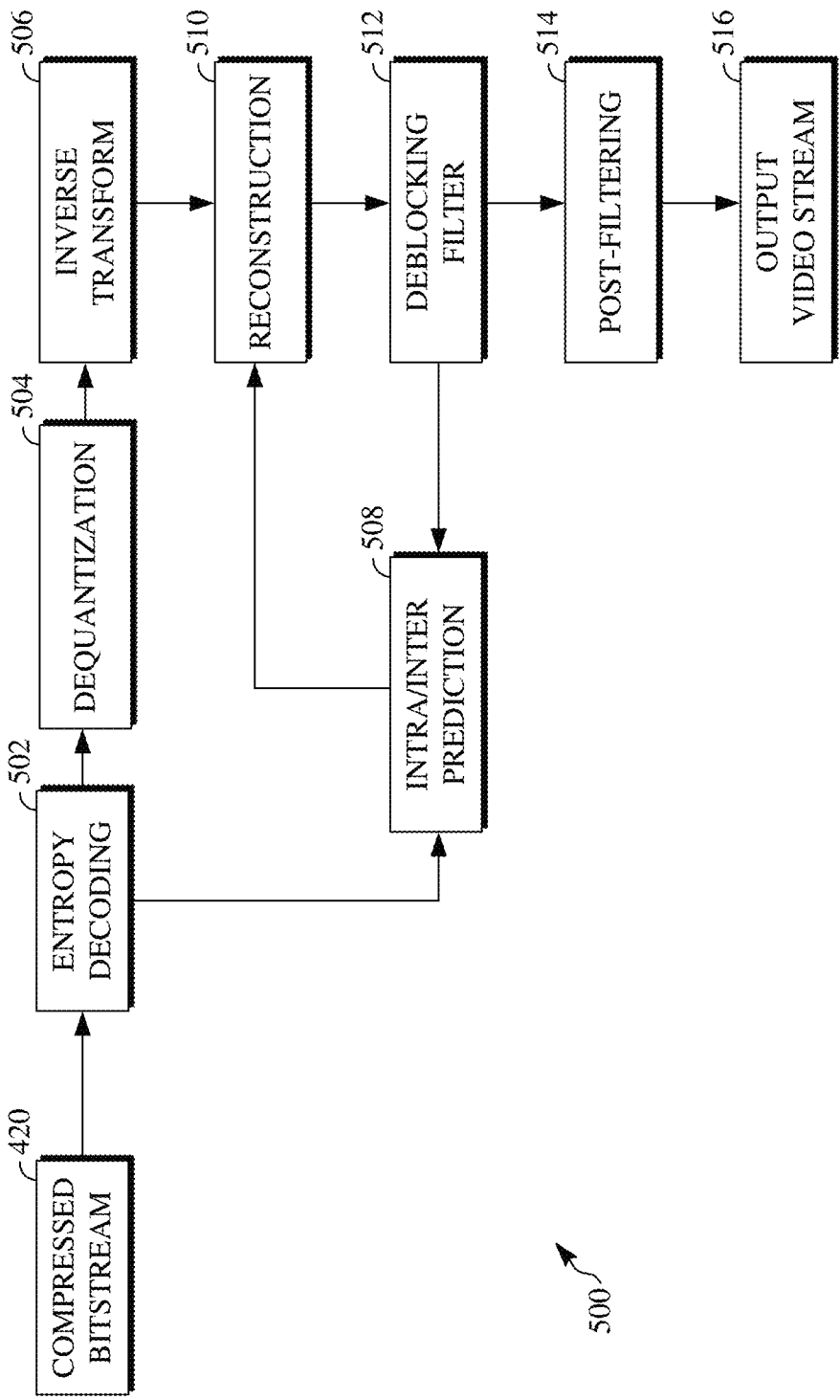
FIG. 5 is a block diagram of an example of a decoder.

FIG. 5 is a block diagram of a decoder 500. The decoder 500 can be implemented, as described above, in the receiving station 104 shown in FIG. 1, such as by providing a computer software program stored in memory, for example, the memory 204 shown in FIG. 2. The computer software program can include machine instructions that, when executed by a processor such as the processor 202 shown in FIG. 2, cause the receiving station 104 to decode video data in the manner described in FIG. 5. The decoder 500 can also be implemented in specialized hardware (e.g., an integrated circuit) included in, for example, the receiving station 104.

The decoder 500, similar to the reconstruction path of the encoder 400 described above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a deblocking filter stage 512, and an optional post-filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The deblocking filter stage 512 can be applied to the reconstructed block to reduce blocking artifacts (e.g., using deblocking filtering, sample adaptive offset filtering, other loop filter functionality, or the like, or a combination thereof). Implementations and examples of a deblocking filter used at the deblocking filter stage 512 are described below with respect to FIG. 6. Other filtering can be applied to the reconstructed block. In this example, the post-filtering stage 514 is applied to the reconstructed block to reduce blocking distortion, and the result is output as the output video stream 516. The output video stream 516 can also be referred to as a decoded video stream, and the terms will be used interchangeably herein.

Implementations of the decoder 500 may differ from what is shown and described with respect to FIG. 5. In some implementations, the decoder 500 can omit or otherwise not process data using the post-filtering stage 514. Further, while the decoder 500 as shown in FIG. 5 is an example of a decoder for decoding encoded video data, such as an encoded video frame or an encoded video block, in other implementations, the decoder 500 may be an example of a decoder for decoding encoded image data, such as an encoded image frame or an encoded image block.

In such an implementation, the decoder 500 omits the intra/inter prediction stage 508. For example, the output of the deblocking filter stage 512 can be sent to the dequantization stage 504 for further processing. In another example, where the error level for the image frame meets a threshold, the output of the deblocking filter stage 512 can instead be sent to the post-filtering stage 514 and/or as output to a display for rendering. In some implementations where the decoder 500 is used to decode encoded image data, the decoder 500 may omit the entropy decoding stage 502.

Figure 6:
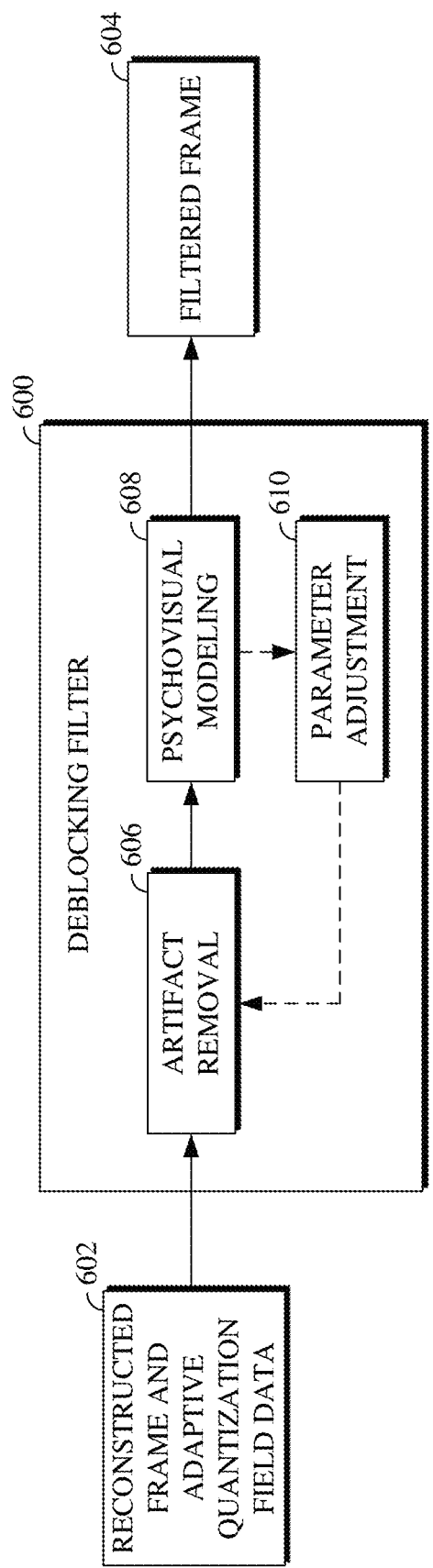
FIG. 6 is a block diagram of an example of a spatially adaptive quantization-aware deblocking filter used for encoding or decoding a video frame or an image.

FIG. 6 is a block diagram of an example of a spatially adaptive quantization-aware deblocking filter 600 (hereafter referred to as the deblocking filter 600) used for encoding or decoding a frame, such as a video frame or an image frame. The deblocking filter 600 may, for example, be the deblocking filter used in the deblocking filter stage 416 shown in FIG. 4, the deblocking filter using in the deblocking filter stage 512 shown in FIG. 5, or both.

The deblocking filter 600 receives reconstructed frame and adaptive quantization field data 602 and uses those to produce a filtered frame 604. The reconstructed frame includes data produced by reconstructing some number of decoded blocks, which decoded blocks represent dequantized and inverse transformed coefficients. For example, the reconstructed frame can be produced using the reconstruction stage 414 shown in FIG. 4 or the reconstruction stage 510 shown in FIG. 5. The adaptive quantization field data represents weights applied to quantization values used to encode those blocks. The adaptive quantization field data includes values indicative of the quantization levels used to encode different areas of the frame. The values of the adaptive quantization field data are determined by analyzing the entire frame, such as to determine the areas in which to apply a higher or lower weight to the quantization.

The deblocking filter 600 includes an artifact removal stage 606, a psychovisual modeling stage 608, and a parameter adjustment stage 610. The artifact removal stage 606 receives the reconstructed frame and adaptive quantization field data 602. The artifact removal stage 606 filters the reconstructed frame to remove some number of blocking artifacts from the reconstructed frame. The filtering of the reconstructed frame by the artifact removal stage 606 is controlled using the adaptive quantization field data.

The artifact removal stage 606 compares the reconstructed frame to the original (e.g., pre-encoded) frame to determine differences between those frames as a result of the encoding. In areas where those differences reflect that the reconstructed frame does not accurately represent the original frame, the artifact removal stage 606 applies a filter to reduce the number of blocking artifacts. The artifact removal stage 606 modules a transition from a small difference to a large difference based on the adaptive quantization field data. For example, the artifact removal stage 606 may change the neighborhood size of the deblocking filter 600 based on the adaptive quantization field data. In another example, the artifact removal stage 606 may use a greater weight for the values within the original frame when performing the filtering, such as to err on the side of preserving more of the original frame data.

The deblocking filter 600 may be a directional filter such that blocking artifacts removed by the artifact removal stage 606 may be filtered based on a filtering direction. In particular, the deblocking filter 600 (e.g., at the artifact removal stage 606 or another stage (not shown) preceding the artifact removal stage 606) can determine a most invariant direction within a given area of the frame and filter along that most invariant direction. The most invariant direction refers to a directional line of pixels that has a lowest variation in color, light, or other intensity. The filtering can include calculating average values for the pixels on each side of the directional line and replacing blocking artifacts with those average values.

The artifact removal stage 606 filters along the determined filtering direction by using the adaptive quantization field data for the respective area or areas of the frame to modulate parameters of the deblocking filter 600. The directional filter 600 may have a number of parameters it uses for filtering frame data, including, for example, a non-linearity selection parameter, a filter size parameter, or a directional sensitivity parameter. The non-linearity selection parameter reflects data or types of data to preserve within the frame (e.g., to not remove by the filtering). The filter size parameter reflects a number of pixels that the filter is applied against at a given operation. The directional sensitivity parameter reflects a sensitivity of the filtering direction selection.

The adaptive quantization field data is used to modulate some or all of the parameters of the deblocking filter 600 based on the quantization levels used to encode different areas of the frame. Thus, during the artifact removal stage 606, the adaptive quantization field data indicates a quantization level used to encode a given area of the frame. The artifact removal stage 606 then uses that quantization level information to control the removal of blocking artifacts within that given area. For example, the artifact removal stage 606 can modulate the non-linearity selection parameter for filtering a given area of the frame upon determining a fine detail to preserve within the frame (e.g., a scratch on a painted surface).

Modulating the non-linearity selection parameter includes changing a threshold indicative of a difference between the original frame and the reconstructed frame. The threshold may, for example, reflect a maximum acceptable difference for a given area of the frame based on the values of the adaptive quantization field data that are associated with that given area. For example, a greater difference between the original frame and the reconstructed frame within a given area of the frame may be acceptable according to the non-linearity selection parameter where a greater quantization weight is applied in that given area.

The psychovisual modeling stage 608 uses software rules for processing the frame after filtering at the artifact removal stage 606 based on visually perceptible qualities of the frame. The software rules of the psychovisual modeling stage 608 focus on three properties of vision: first, that gamma correction should not be separately applied to every RGB channel; second, that high frequency changes in blue color data can be less precisely encoded; and third, that areas including larger amounts of visual noise within a frame can be less precisely encoded.

The first property of vision is driven by the overlap of sensitivity spectra of the cones of the human eye. For example, because there is some relationship between the amount of yellow light seen and sensitivity to blue light, changes in blue color data in the vicinity of yellow color data can be compressed less precisely. YUV color spaces are defined as linear transformations of gamma-compressed RGB and are therefore not powerful enough to model such phenomena. The second property of vision is driven by the color receptors of the retina of the human eye. In particular, the human eye has lower spatial resolution in blue than in red and green, and the retina has almost no blue receptors in the high-resolution area. The third property of vision is defined based on a relationship between visibility and proximal visual activity. That is, the visibility of fine structures in an area of an image may depend on the amount of visual activity in the vicinity of that area.

Although the software rules of the psychovisual modeling stage 608 are described with reference to three properties of vision, other numbers of properties of vision, other rules related to video or image encoding or perceptibility, or a combination thereof may be used to define or otherwise configure the software rules of the psychovisual modeling stage 608.

The software rules of the psychovisual modeling stage 608 can thus be used to determine a number of blocking artifacts remaining within some or all of the areas of the frame. The psychovisual modeling stage 608 next compares that number of blocking artifacts to a psychovisual model threshold reflecting a maximum number of visually perceptible artifacts to include in the frame. The value of the psychovisual model threshold may be configured by default or set empirically, such as by iterating the deblocking filter 600 over N frames. If the psychovisual model threshold is exceeded such that the number of blocking artifacts remaining within the frame after the filtering at the artifact removal stage 606 is too large, the psychovisual modeling stage 608 sends the filtered frame and associated data to the parameter adjustment stage 610. Otherwise, the filtered frame 604 is output.

The psychovisual model threshold may also or instead reflect a maximum acceptable difference between the original frame and the frame after processing at the artifact removal stage 606. For example, the psychovisual modeling stage 608 can use the psychovisual model threshold as a basis for comparing coefficient or pixel values within a specific area of the original frame and the frame after processing at the artifact removal stage 606. If that comparison indicates that the coefficient or pixel value differences between those frames is less than the psychovisual model threshold, the differences are preserved. However, if that comparison indicates that those differences are not less than the psychovisual model threshold, the psychovisual modeling stage 608 may cause the frame to undergo further filtering at the artifact removal stage 606.

The parameter adjustment stage 610 adjusts some parameter used by the artifact removal stage 606 before returning the frame to the artifact removal stage 606 for further filtering. The parameter adjustment stage 610 may, for example, adjust one or more values of the adaptive quantization field data. For example, based on the results of the psychovisual modeling stage 608, the parameter adjustment stage 610 can increase or decrease the adaptive quantization field data values for a given area of the frame, such as to correspondingly increase or decrease the amount of quantization within that given area.

In another example, the parameter adjustment stage 610 may adjust one or more of the parameters of the deblocking filter 600 itself. For example, based on the visually perceptible qualities of the filtered frame, such as may be determined as a result of the psychovisual modeling stage 608, the parameter adjustment stage 610 can adjust the non-linearity selection parameter of the deblocking filter 600 for certain areas of the frame.

Adjustments to the adaptive quantization field data may be limited by an error level definition representing a maximum quantization error for the frame. For example, where an adjustment to the adaptive quantization field data causes the total quantization error for the frame to exceed the error level definition, that adjustment is either discarded or offset by a corresponding adjustment to another area of the frame. For example, where a determination is made to adjust a first area of the frame by increasing the quantization weight for that area by X, and where that increase causes the total quantization error to exceed the error level definition, a corresponding determination is also made to adjust a second area of the frame by decreasing the quantization weight therefore by X.

Adjustments determined or otherwise made at the parameter adjustment stage 610 are looped back to the artifact removal stage 606 for further filtering. The deblocking filter 600 may iterate multiple times through some or all of the artifact removal stage 606, the psychovisual modeling stage 608, or the parameter adjustment stage 610 before the finally filtered frame 604 is output. Iterating through the filtering of the frame using the deblocking filter 600 can include producing a model for the deblocking filter 600. For example, the deblocking filter 600 can include functionality for learning the types of filtering applied to and the types of adjustments that are made for a given frame. When another frame is received for filtering, the deblocking filter 600 may use the learned model to make multiple filtering applications or adjustments at a time, such as to improve processing speeds.

Implementations of the deblocking filter 600 may differ from what is shown and described with respect to FIG. 6. In some implementations, the psychovisual modeling stage 608 and the parameter adjustment stage 610 can be external to the deblocking filter 600. For example, the deblocking filter 600 may only include functionality for performing the operations of the artifact removal stage 606. The deblocking filter 600 may thus output the filtered frame 604 produced using the artifact removal stage 606 to the psychovisual modeling stage 608, which may then process the filtered frame 604 to determine whether to re-filter the filtered frame 604 using the deblocking filter 600.

In some such implementations, the psychovisual modeling stage 608 can process the reconstructed frame and adaptive quantization field data 602 before the artifact removal stage 606. For example, the psychovisual modeling stage 608 can process the reconstructed frame and adaptive quantization field data 602 to determine a number of blocking artifacts to remove from the reconstructed frame and the locations of those blocking artifacts within the frame. The artifact removal stage 606 then removes those blocking artifacts and outputs the filtered frame 604. The parameter adjustment stage 610 can then receive the filtered frame 604 output from the deblocking filter 600 and process the filtered frame 604 to determine whether to adjust values of the adaptive quantization field data and re-filter the filtered frame 604 using the adjusted adaptive quantization field data.

Where a determination is made to adjust the adaptive quantization field data and re-filter the filtered frame 604, the parameter adjustment stage 610 accordingly adjusts the respective values of the adaptive quantization field data. The parameter adjustment stage 610 then sends the filtered frame and adjusted adaptive quantization field data back to the deblocking filter 600 for re-processing by the artifact removal stage 606. Where a determination is made to not adjust the adaptive quantization field data and re-filter the filtered frame 604, the parameter adjustment stage 610 causes the filtered frame 604 to be output, such as to a compressed bitstream, for storage, for further processing, for rendering at a display, or the like.

In some implementations, the performance of the psychovisual modeling stage 608 may be different depending on the type of data being processed by the deblocking filter 600. For example, where the deblocking filter 600 is processing image data (e.g., such that the reconstructed frame is a reconstructed image), the psychovisual modeling stage 608 may use a larger threshold for determining visual perceptibility, as the filtered frame 604 will be affixed when displayed. However, where the deblocking filter 600 is processing video data (e.g., such that the reconstructed frame is a reconstructed video frame), the psychovisual modeling stage 608 may use a smaller threshold for determining the visual perceptibility, as the filtered frame 604 will only be displayed for a very short amount of time.

In some implementations, the deblocking filter 600 may filter the frame other than by determining and using a most invariant direction. For example, a machine learning algorithm may be used to determine an optimal filtering direction to use at the artifact removal stage 606. In another example, data indicative of the filtering direction to use may be explicitly signaled to a decoder from an encoder, such as within a frame header.

Figure 7:
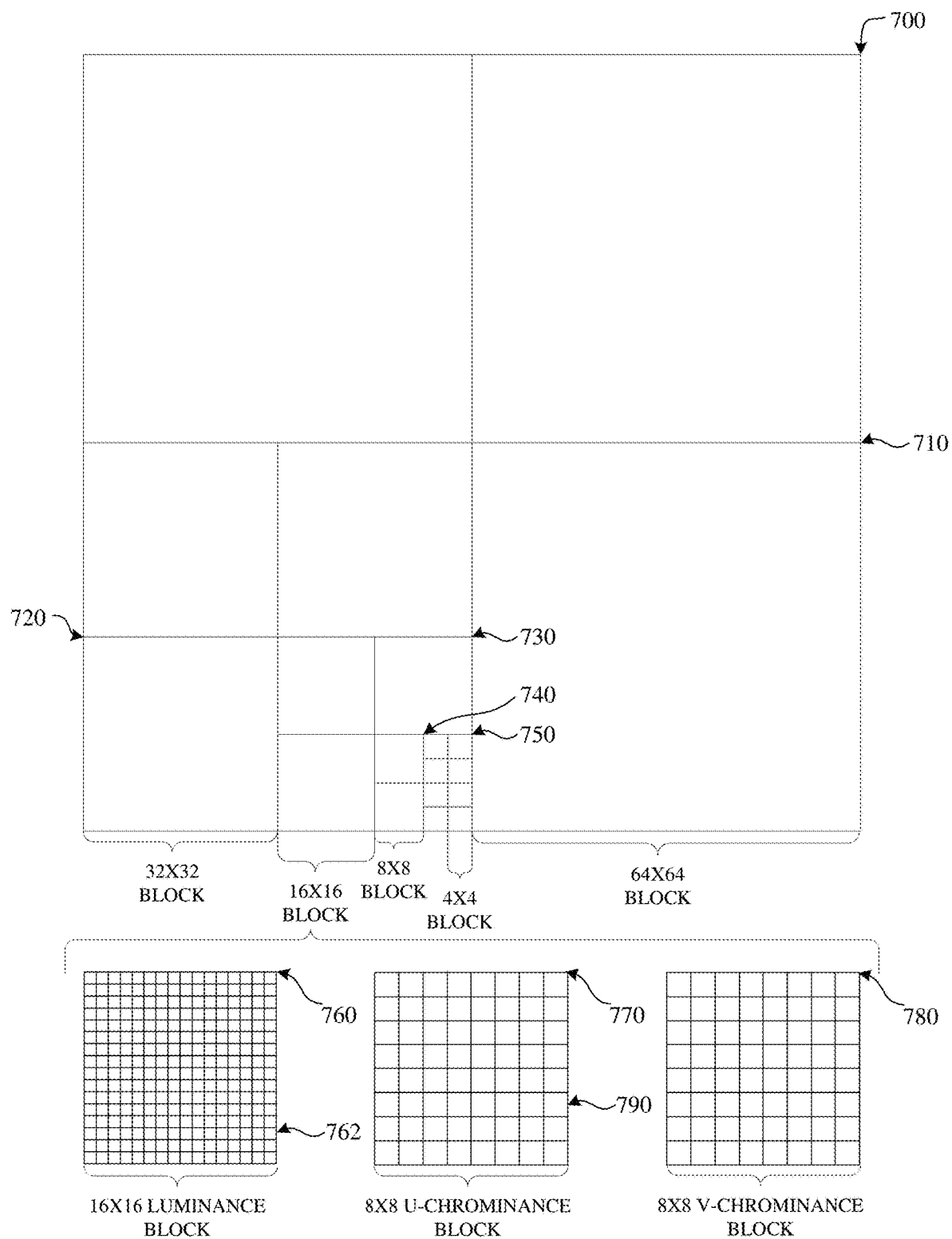
FIG. 7 is a block diagram representing portions of a video frame or image.

FIG. 7 is a block diagram representing portions of a frame 700. The frame may be a video frame, for example, the video frame 306 shown in FIG. 3A, or an image frame, for example, the image frame 312 shown in FIG. 3B. As shown, the frame 700 includes four 64×64 blocks 710, in two rows and two columns in a matrix or Cartesian plane. In some implementations, a 64×64 block may be a maximum coding unit, N=64. Each 64×64 block may include four 32×32 blocks 720. Each 32×32 block may include four 16×16 blocks 730. Each 16×16 block may include four 8×8 blocks 740. Each 8×8 block 740 may include four 4×4 blocks 750. Each 4×4 block 750 may include 16 pixels, which may be represented in four rows and four columns in each respective block in the Cartesian plane or matrix.

The pixels may include information representing an image captured in the frame 700, such as luminance information, color information, and location information. In some implementations, a block, such as a 16×16 pixel block as shown, may include a luminance block 760, which may include luminance pixels 762; and two chrominance blocks 770, 780, such as a U or Cb chrominance block 770, and a V or Cr chrominance block 780. The chrominance blocks 770, 780 may include chrominance pixels 790. For example, the luminance block 760 may include 16×16 luminance pixels 762 and each chrominance block 770, 780 may include 8×8 chrominance pixels 790 as shown. Although one arrangement of blocks is shown, any arrangement may be used. Although FIG. 7 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof, may be used.

In some implementations, coding the frame 700 may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block of the frame 700 may include using quad-tree coding, which may include coding smaller block units within a block in raster-scan order. For example, the 64×64 block shown in the bottom left corner of the portion of the frame 700 may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded.

Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, coding the frame 700 may include encoding the information included in an original, or input, frame by, for example, omitting some of the information in the original frame from a corresponding encoded frame. For example, the coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, another color model may be used.

In some implementations, reducing spatial redundancy may include transforming a block into the frequency domain using, for example, a discrete cosine transform. For example, a unit of an encoder, such as the transform stage 404 shown in FIG. 4, may perform a discrete cosine transform using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a predictor to use for encoding a current block or pixel of the current frame with maximal efficiency. For example, the search may identify a portion of the reference frame for which the difference in pixel values between the current block and a prediction block generated based on the portion of the reference frame is minimized, and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a predictor may include calculating a cost function, such as a sum of absolute differences (SAD), between the pixels of portions of the search area and the pixels of the current block.

In some implementations, the spatial difference between the location of the portion of the reference frame for generating a predictor in the reference frame and the current block in the current frame may be represented as a motion vector. The difference in pixel values between the predictor block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

As described above, the frame 700 may be a frame of a video sequence, or it may be an image. Regardless of whether the frame 700 represents image data or video data, the frame 700 includes a single picture to encode or decode. The picture included in the frame 700 may have different types of detail in different areas. An area of a frame as described herein refers to an M×N-sized region of the frame, where M and N may be the same or a different value. For example, an area of a frame may be a single block (e.g., an 8×8 block) within the frame. In another example, an area of a frame may be multiple blocks within the frame. In yet another example, different areas of a frame to encode may be different sized blocks (e.g., some 8×8, some 4×4, some 16×16, etc.).

For example, the frame 700 may include a picture of a forest with a sky over the forest. The forest may be shown in the lower two 64×64 blocks 710, while the sky is shown in the upper two 64×64 blocks 710. The data included in the lower two 64×64 blocks 710 may include more detail than the data included in the upper two 64×64 blocks 710. For example, the depiction of the forest may include a number of small details for branches or leaves of trees along with other plant and/or animal life present in the forest. In contrast, the depiction of the sky may merely reflect gradient shades of blue. As such, the majority of the information in the frame 700 is located in the lower two 64×64 blocks 710.

Encoding or decoding the frame 700 can include quantizing the different areas of the frame 700 (e.g., the different blocks 710, 720, 730, 740, 750) by applying different weights to the quantization value for the frame 700 based on the data included in those areas. For example, a first area of an image that includes more information (e.g., greater detail) may be quantized using a smaller weight than a second area that includes less information (e.g., lesser detail). The information contained within the first area will be quantized less than the information contained within the second area. This results in a smaller loss of information within the first area than within the second area.

With the example in which the frame 700 shows a forest and a sky, the adaptive quantization field data for the frame 700 can be produced to reflect that greater quantization is used for the information within the blocks representing the sky and lesser quantization is used for the information within the blocks representing the forest. More particularly, values of the adaptive quantization field data for the blocks including the sky information reflect that those blocks are quantized using a larger weight than the blocks including the forest information. The values of the adaptive quantization field data for all four of the 64×64 blocks 710 may be controlled by an error level definition represents the maximum quantization error resulting from the encoding of the frame 700.

Figure 8:
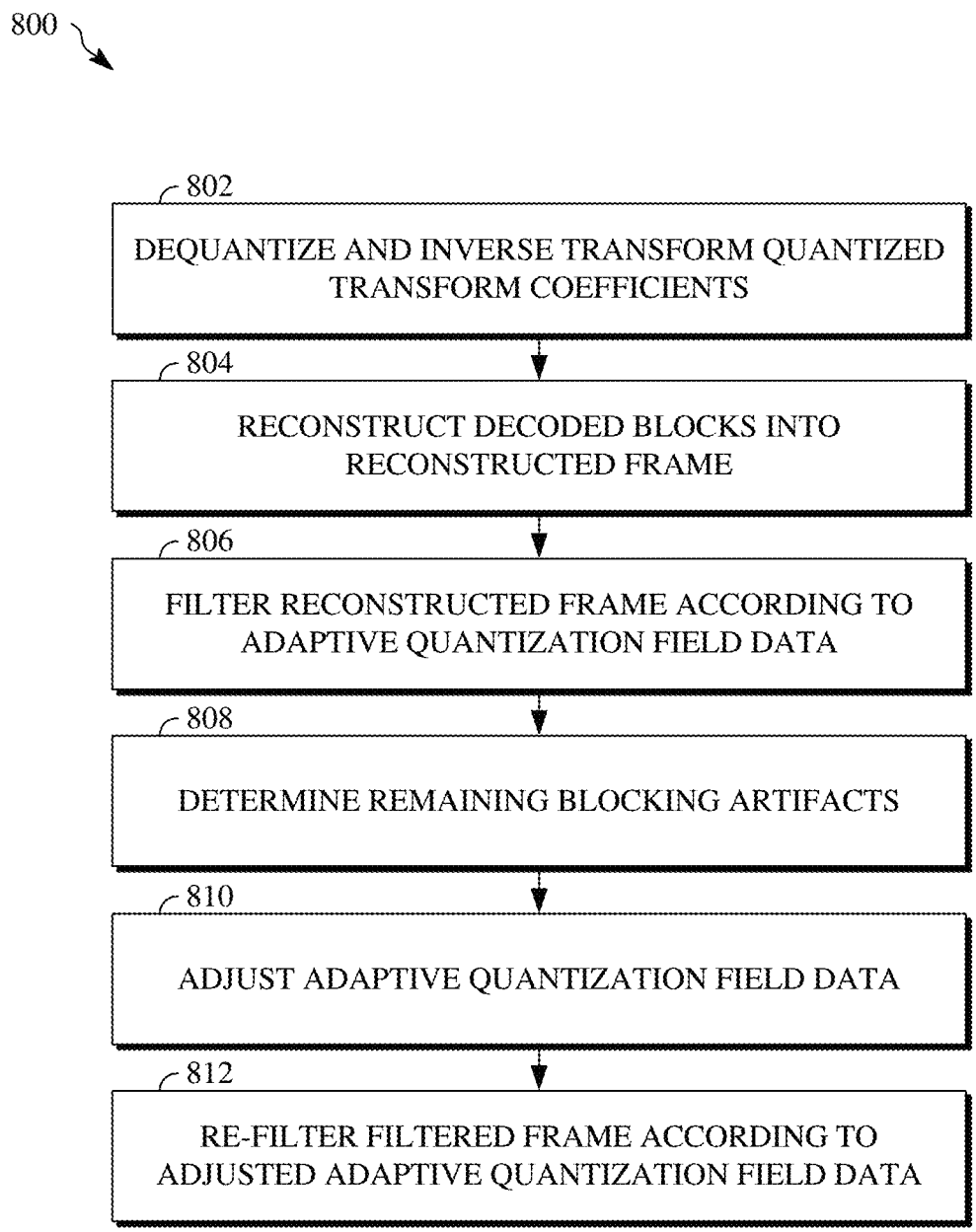
FIG. 8 is a flowchart diagram of an example of a technique for encoding or decoding a video frame or an image frame using a spatially adaptive quantization-aware deblocking filter.
Figure 9:
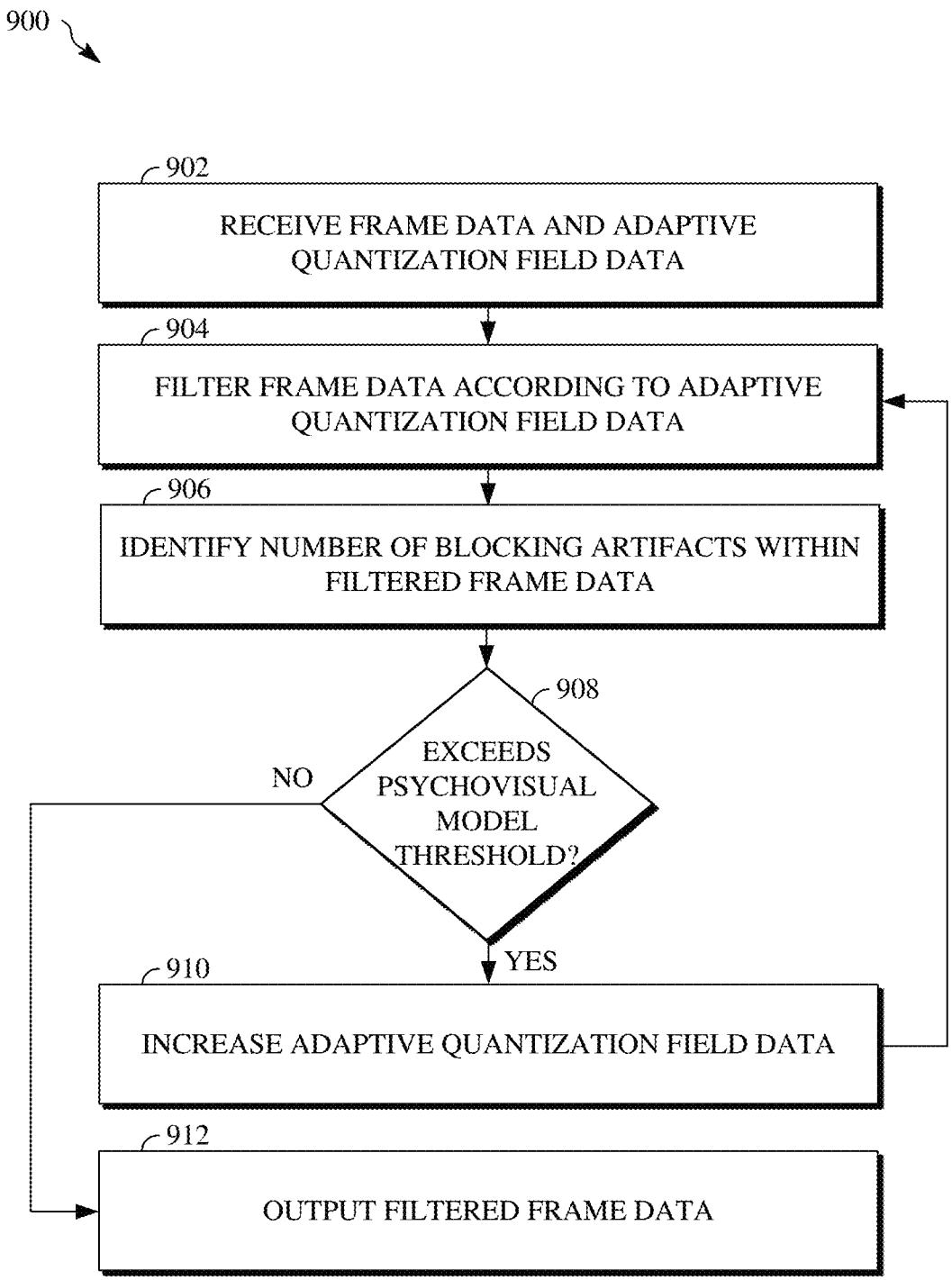
FIG. 9 is a flowchart diagram of an example of a technique for iteratively filtering a video frame or an image frame according to adaptive quantization field data.

Techniques for encoding or decoding video frames are now described with respect to FIGS. 8 and 9. FIG. 8 is a flowchart diagram of an example of a technique 800 for encoding or decoding a video frame or an image frame using a spatially adaptive quantization-aware deblocking filter. FIG. 9 is a flowchart diagram of an example of a technique 900 for iteratively filtering a video frame or an image frame according to adaptive quantization field data.

One or both of the technique 800 or the technique 900 can be implemented, for example, as a software program that may be executed by computing devices such as the transmitting station 102 or the receiving station 104 shown in FIG. 1, or otherwise by the computing device 200 shown in FIG. 2. For example, the software program can be or otherwise include an encoder, such as the encoder 400 shown in FIG. 4, or a decoder, such as the decoder 500 shown in FIG. 5.

The software program can include machine-readable instructions that may be stored in a memory such as the memory 204 or the secondary storage 214 shown in FIG. 2, and that, when executed by a processor, such as the processor 202 shown in FIG. 2, may cause the computing device to perform one or both of the technique 800 or the technique 900.

The technique 800 and/or the technique 900, or an encoder and/or decoder (e.g., the encoder 400 and/or the decoder 500) used to perform the technique 800 and/or the technique 900, can be implemented using specialized hardware or firmware (e.g., an integrated circuit). As explained above, some computing devices may have multiple memories or processors, and the operations described in the technique 800 and the technique 900 can be distributed using multiple processors, memories, or both.

For simplicity of explanation, the technique 800 and the technique 900 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for encoding or decoding a video frame or an image frame using a spatially adaptive quantization-aware deblocking filter is shown. The technique 800 can be performed for encoding a video frame or an image, such as to a bitstream. Alternatively, the technique 800 can be performed for decoding an encoded video frame or an encoded image, such as from a bitstream. For example, during encoding, the technique 800 can be performed by the reconstruction path (e.g., the stages 410, 412, 414, and 416) of the encoder 400 shown in FIG. 4. In another example, during decoding, the technique 800 can be performed by the stages 504, 506, 510, and 512 of the decoder 500 shown in FIG. 5.

At 802, quantized transform coefficients associated with a video frame or image (either hereafter referred to as a frame) to encode or decode are dequantized and inverse transformed. The quantized transform coefficients represent pixel values of the original video frame or original image after those pixel values are transformed and quantized during encoding. The quantized transform coefficients are coefficients of blocks of the video frame or image. Decoded blocks are produced by dequantizing and inverse transforming the quantized transform coefficients. The decoded blocks may, for example, be derivative residual blocks, such as where the frame is a video frame. At 804, the decoded video blocks are reconstructed into a reconstructed frame.

At 806, the reconstructed frame is filtered according to adaptive quantization field data associated with the frame. The adaptive quantization field data may be produced at a quantization stage of an encoder or received by a decoder, such as within a bitstream. Filtering the reconstructed frame according to the adaptive quantization field data includes applying a deblocking filter to the reconstructed frame to remove some number of blocking artifacts from the reconstructed frame. The number of blocking artifacts to be removed by the deblocking filter is controlled by the adaptive quantization field data. A first filtered frame is produced as a result of filtering the reconstructed frame.

The performance of the deblocking filter may controlled or otherwise configured using one or more parameters of the deblocking filter. As such, applying the deblocking filter to the reconstructed frame according to the adaptive quantization field data can include applying some or all of the filter parameters to the reconstructed frame, where those filter parameters are defined based on the adaptive quantization field data. The parameters may, for example, include a non-linearity selection parameter, a filter size parameter, a directional sensitivity parameter, or the like, or a combination thereof. Furthermore, given that the filter parameters are defined based on the adaptive quantization field data, the adaptive quantization field data can be used to modulate one or more parameters of the deblocking filter.

Using the adaptive quantization field data to module parameters of the deblocking filter can include modulating a non-linearity selection parameter of the deblocking filter according to the adaptive quantization field data to determine to preserve data within the reconstructed frame. For example, the non-linearity selection parameter can be modulated for determining which types of data to preserve within the reconstructed frame. As a result, the coefficients used to represent such types of data within the reconstructed frame are not processed by the deblocking filter.

For example, the non-linearity selection parameter can be modulated according to a psychovisual model. The psychovisual model can indicate that certain types of data may be more or less visually perceptible. Thus the non-linearity selection parameter can be modulated based on the psychovisual model to cause more visually perceptible data within the frame to be preserved and to cause less visually perceptible data within the frame to be subject to modification.

The adaptive quantization field data indicates to the deblocking filter the areas of the reconstructed frame that were processed using relatively higher or relatively lower quantization values. As described above, the adaptive quantization field data represents weights applied to quantization values used to encode the blocks of the frame. Thus, the quantization values applied at local areas of the reconstructed frame are used to guide the processing of the deblocking filter.

For example, the reconstructed frame may include a first area that was processed during encoding using a relatively high quantization value and a second area that was processed during encoding using a relatively low quantization value. The deblocking filter may thus use the adaptive quantization field data for the reconstructed frame to apply a relatively stronger filter to the first area of the reconstructed frame and to apply a relatively weaker filter to the second area. As a result, the deblocking filter removes a greater number of blocking artifacts from the first area than from the second area.

At 808, a number of blocking artifacts remaining within the first filtered frame is determined. Determining the number of blocking artifacts remaining within the first filtered frame includes processing data of the first filtered frame using a psychovisual model. The psychovisual model may, for example, be a model configured to process video frame or image data based on human perceptibility. Implementations and examples for determining to adjust adaptive quantization field data are further described below with respect to FIG. 9.

At 810, the adaptive quantization field data is adjusted. Adjusting the adaptive quantization field data includes changing (e.g., increasing or decreasing) the weight applied to the quantization values for at least some of the areas of the first filtered frame. For example, adjusting the adaptive quantization field data can include increasing a value of the adaptive quantization field data, where the value is associated with one or more of the decoded blocks used to produce the reconstructed frame. For example, the value can reflect a weight applied to a quantization value in a particular one of those decoded blocks, the value resulting from applying that weight to that quantization value, or another value reflected by the adaptive quantization field data.

The adjustments to the adaptive quantization field data can be limited by data associated with the frame being encoded or decoded. For example, increases to the adaptive quantization field data may be limited by an error level definition associated with the frame. The error level definition represents the maximum quantization error resulting from the encoding of the frame. As such, the adaptive quantization field data may not be increased in a way that causes the quantization error for the frame to exceed the error level definition. In another example, decreases to the adaptive quantization field data may be limited by a file size definition for the frame (e.g., during encoding operations). As such, the adaptive quantization field data may not be decreased in a way that causes the total file size of the resulting encoded frame to exceed the file size definition.

At 812, the first filtered frame produced by the earlier filtering of the reconstructed frame is re-filtered according to adjusted adaptive quantization field data. Re-filtering the first filtered frame according to the adjusted adaptive quantization field data includes applying the deblocking filter to the first filtered frame to remove some number of blocking artifacts from the first filtered frame. The number of blocking artifacts to be removed by the deblocking filter is controlled by the adjusted adaptive quantization field data. A second filtered frame is produced as a result of filtering the first filtered frame. The re-filtering can be performed in the same or substantially the same way as the earlier filtering of the reconstructed frame.

In some implementations where the technique 800 is performed for decoding an encoded video frame or an encoded image, the technique 800 includes decoding syntax data associated with the encoded video frame or the encoded image, such as from a bitstream. The syntax data includes the quantized transform coefficients of the encoded blocks of the encoded video frame or of the encoded image. The syntax data also includes the adaptive quantization field data.

The syntax data may be some or all of the data stored in the bitstream or another data store and which is associated with the encoded video frame or the encoded image. For example, the syntax data may include the quantized transform coefficients for some or all of the encoded blocks of the encoded video frame or encoded image. In another example, the syntax data can include metadata, such as from a frame header for the encoded video frame or from an image header for the encoded image.

In some implementations, the technique 800 includes determining whether to adjust at the adaptive quantization field data prior to adjusting the adaptive quantization field data. For example, the determination can be made by comparing the number of blocking artifacts remaining within the first filtered frame to a threshold, such as a psychovisual model threshold.

In some implementations, the technique 800 includes outputting the second filtered frame produced by re-filtering the first filtered frame using the adjusted adaptive quantization field. For example, when the technique 800 is performed for encoding a video frame or an image, the second filtered frame can be output to a compressed bitstream, such as the compressed bitstream 420 shown in FIG. 4, or to storage for later transmission, such as to the receiving station 104. In another example, when the technique 800 is performed for decoding an encoded video frame or an encoded image, the second filtered frame can be output to an output video stream, such as the output video stream 516 shown in FIG. 5, or for rendering, such as at the display 218 shown in FIG. 2.

In some implementations, the technique 800 includes further adjusting the adaptive quantization field data. For example, responsive to re-filtering the reconstructed frame (e.g., to produce second filtered frame data), the adaptive quantization field data may be further adjusted, such as based on a number of blocking artifacts within the second filtered video frame. For example, a determination can be made that the first filtered frame data produced by the first filtering includes too many blocking artifacts (e.g., based on a threshold value associated with a psychovisual model). The further adjustment to the adaptive quantization field data can be based on that determination.

Subsequent to the further adjustment of the adaptive quantization field data, the deblocking filter can be used to further re-filter the reconstructed frame data, such as to produce a third filtered frame. The third filtered frame may then be output, such as to a compressed bitstream, to a compressed image storage, or for further processing (e.g., during encoding), or to an output video stream or for image rendering (e.g., during decoding). In some implementations, the third filtered frame can be output along with the second filtered frame. In some implementations, the third filtered frame can be output instead of the second filtered frame.

Referring next to FIG. 9, the technique 900 for iteratively filtering a video frame or an image frame according to adaptive quantization field data is shown. The technique 900 can be performed during encoding operations for encoding a video frame or an image, such as to a bitstream. Alternatively, the technique 900 can be performed during decoding operations for decoding an encoded video frame or an encoded image, such as from a bitstream. For example, during encoding, the technique 900 can be performed using the deblocking filter 600 shown in FIG. 6 (when included in an encoder) or the deblocking filter of the deblocking filter stage 416 shown in FIG. 4. In another example, during decoding, the technique 900 can be performed using the deblocking filter 600 (when included in a decoder) or the deblocking filter of the deblocking filter 512 shown in FIG. 5.

At 902, frame data and adaptive quantization field data are received. The frame data may, for example, be a reconstructed frame, such as which may be produced based on dequantized and inverse transformed video or image coefficients. The adaptive quantization field data represents weights applied to quantization values used to quantize those video or image coefficients. At 904, the frame data is filtered according to the adaptive quantization field data. Implementations and examples for filtering frame data according to adaptive quantization field data are described above with respect to FIG. 8. At 906, a number of blocking artifacts remaining within the filtered frame data is identified.

At 908, a determination is made as to whether the number of blocking artifacts remaining within the filtered frame data exceeds a psychovisual model threshold. The psychovisual model threshold reflects a maximum number of visually perceptible blocking artifacts that can be present within a frame without the frame incurring a loss in visual quality. As such, determining whether the number of blocking artifacts remaining within the filtered frame data exceeds the psychovisual model threshold includes using the psychovisual model to determine that the number of blocking artifacts remaining within the filtered frame data exceeds a maximum number of visually perceptible blocking artifacts allowed within the filtered frame.

At 910, responsive to a determination that the number of blocking artifacts remaining within the filtered frame data exceeds the psychovisual model threshold, one or more values of the adaptive quantization field data are increased, such as to cause more quantization to occur within the one or more corresponding areas of the frame. The technique 900 then returns to 904, where the filtered frame data is further filtered according to the increase value or increased values of the adaptive quantization field data.

At 912, responsive to a determination that the number of blocking artifacts within the filtered frame data does not exceed the psychovisual model threshold, the filtered frame data are output. For example, where the technique 900 is performed to encode the frame, the filtered frame data is output from a reconstruction path of the encoder (e.g., the stages 410, 412, 414 shown in FIG. 4). In another example, where the technique 900 is performed to decode the frame, the filtered frame data is output to an output video stream (e.g., the output video stream 516 shown in FIG. 5) to a post-filtering stage (e.g., the stage 514) before the output video stream.

In some implementations, after identifying a number of blocking artifacts remaining within the filtered frame data, the technique 900 includes determining whether a file size for the filtered frame data including that number of remaining blocking artifacts exceeds a file size threshold. The file size threshold reflects a file size definition for the frame data, such as a maximum total file size for an encoded form of the frame data. Determining the file size for the filtered frame data can include encoding the filtered frame data as a temporary encoded frame and identifying the total storage requirements for that temporary encoded frame.

Responsive to determining that the file size for the filtered frame data exceeds the file size threshold, one or more values of the adaptive quantization field data are decreased, such as to cause less quantization to occur within the one or more corresponding areas of the frame. In some implementations, the technique 900 may then return to 904 for further filtering of the filtered frame data.

Figure 10:
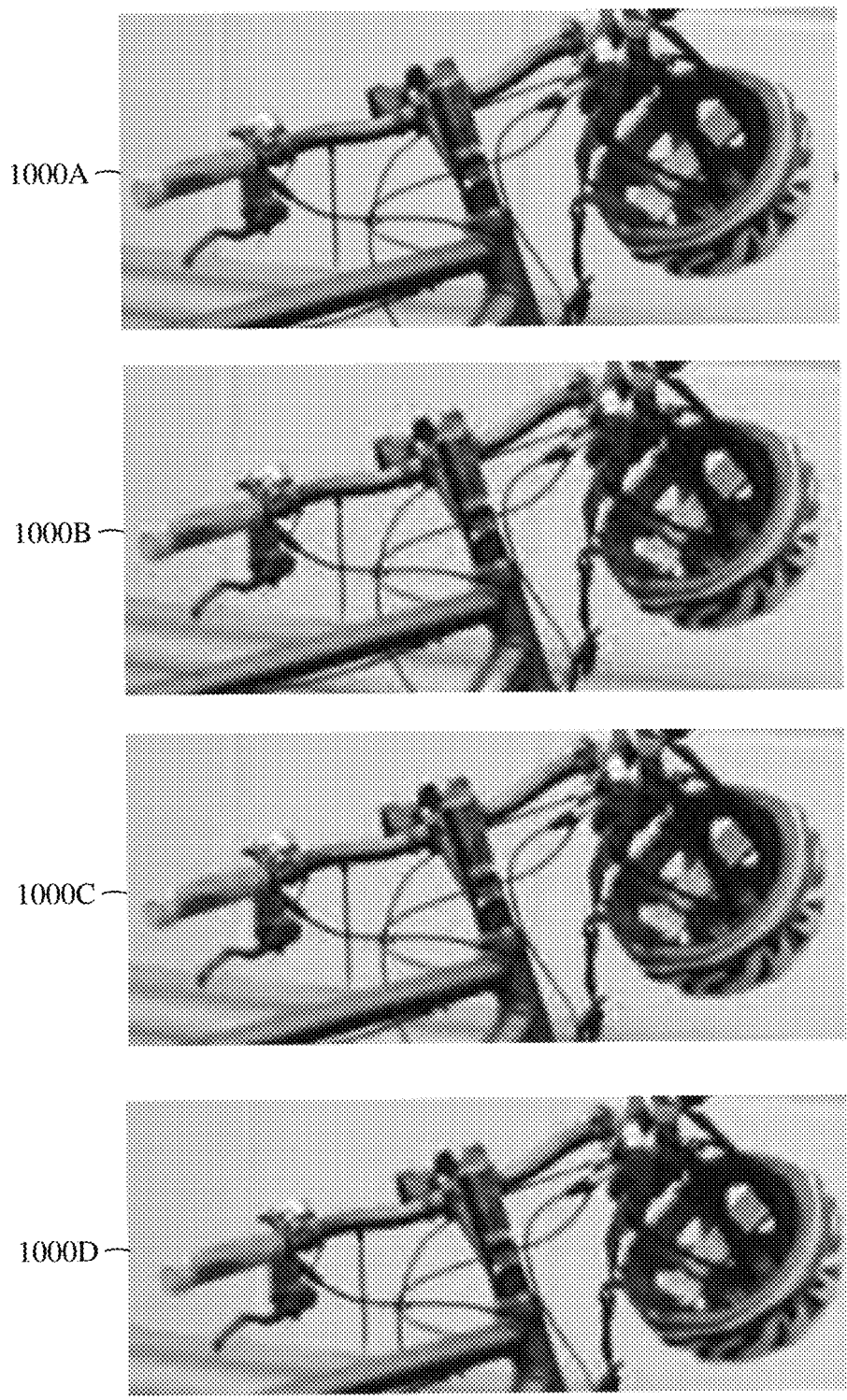
FIG. 10 is an illustration of examples of reproductions of an original video frame or image using different filtering or filter-less techniques.

FIG. 10 is an illustration of examples of reproductions of an original video frame or image 1000A using different filtering or filter-less techniques. The original video frame or image 1000A represents a video frame or image before it is encoded and/or decoded, such as using the encoding and decoding system 100 shown in FIG. 1. A first reproduction 1000B represents the original video frame or image 1000A after encoding and/or decoding without use of a deblocking filter. A second reproduction 1000C represents the original video frame or image 1000A after encoding and/or decoding with the use of a constant deblocking filter. A third reproduction 1000D represents the original video frame or image 1000A after encoding and/or decoding with the use of a spatially adaptive quantization-aware deblocking filter, for example, the deblocking filter 600 shown in FIG. 6.

The aspects of encoding and decoding described above illustrate some examples of encoding and decoding techniques and hardware components configured to perform all or a portion of those examples of encoding and/or decoding techniques. However, it is to be understood that encoding and decoding, as those terms are used in the claims, could mean compression, decompression, transformation, or other processing or changing of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances.

In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 104 (and the algorithms, methods, instructions, etc., stored thereon and/or executed thereby, including by the encoder 400 and/or the decoder 500 and including using the technique 800 and/or the technique 900) can be realized in hardware, software, or any combination thereof. The hardware can include, for example, computers, intellectual property cores, application-specific integrated circuits, programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 104 do not necessarily have to be implemented in the same manner.

The transmitting station 102 or the receiving station 104 may be implemented using a general purpose computer or general purpose processor with a computer program that, when executed, carries out any of the respective methods, algorithms, and/or instructions described herein. In addition, or alternatively, for example, a special purpose computer/processor may be utilized, which can include other hardware for carrying out any of the methods, algorithms, or instructions described herein.

Some or all of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding an encoded frame, the method comprising:
    decoding, from a bitstream to which the encoded frame is encoded, quantized transform coefficients of encoded blocks of the encoded frame and adaptive quantization field data used to encode the encoded blocks;
    producing a reconstructed frame, wherein producing the reconstructed frame includes dequantizing and inverse transforming the quantized transform coefficients;
    filtering the reconstructed frame according to the adaptive field data to produce a filtered frame based on the reconstructed frame, wherein filtering the reconstructed frame includes modulating, according to the adaptive quantization field data, one or more of a non-linearity selection filter parameter, a filter size parameter, or a directional sensitivity filter parameter; and
    outputting the filtered frame for storage or display.

2. The method of claim 1, wherein filtering the reconstructed frame according to the adaptive quantization field data comprises:
    producing filtered data by filtering the reconstructed frame according to the adaptive quantization field data;
    determining a number of blocking artifacts within the filtered data;
    adjusting at least some of the adaptive quantization field data based on the number of blocking artifacts within the filtered data; and
    producing the filtered frame by re-filtering the reconstructed frame according to the adjusted adaptive quantization field data.

3. The method of claim 2, wherein adjusting the at least some of the adaptive quantization field data based on the number of blocking artifacts within the filtered data comprises:
    increasing the adaptive quantization field data responsive to determining that the number of blocking artifacts within the filtered data exceeds a threshold.

4. The method of claim 3, wherein the threshold represents a maximum acceptable difference between a given area of the reconstructed frame and a corresponding area within an original frame encoded to produce the encoded frame.

5. The method of claim 4, wherein the threshold is defined using a psychovisual model which analyzes visually perceptible artifacts resulting from filtering.

6. The method of claim 2, wherein the filtered data is first filtered data, wherein producing the filtered frame by re-filtering the reconstructed frame according to the adjusted adaptive quantization field data comprises:
    producing second filtered data by filtering the reconstructed frame according to the adjusted adaptive quantization field data;
    determining a number of blocking artifacts within the second filtered data;
    further adjusting the adjusted adaptive quantization field data based on the number of blocking artifacts within the second filtered data; and
    producing the filtered frame by re-filtering the reconstructed frame according to the further adjusted adaptive quantization field data.

7. The method of claim 2, wherein adjustments to the adaptive quantization field data are limited by an error level definition representing a maximum quantization error for the reconstructed frame.

8. A method for decoding an encoded frame, the method comprising:
    receiving an encoded frame and adaptive quantization field data used to encode the encoded frame;
    producing a reconstructed frame using the encoded frame;
    changing, based on the adaptive quantization field data, one or more of a non-linearity selection filter parameter, a filter size parameter, or a directional sensitivity filter parameter available for filtering the reconstructed frame;
    producing filtered data by filtering the reconstructed frame according to the adaptive quantization field data and using the changed one or more of the non-linearity selection filter parameter, the filter size parameter, or the directional sensitivity filter parameter;
    determining whether a number of blocking artifacts within the filtered data exceeds a threshold;
    responsive to determining that the number of blocking artifacts within the filtered data exceeds the threshold, adjusting at least some of the adaptive quantization field data for further use in filtering the reconstructed frame; and
    producing a filtered frame by re-filtering the reconstructed frame according to the adjusted adaptive quantization field data.

9. The method of claim 8, wherein adjusting the at least some of the adaptive quantization field data comprises:
    increasing a weight applied to a quantization value used to process a first area of the reconstructed frame by a first amount; and
    increasing a weight applied to a quantization value used to process a second area of the reconstructed frame by a second amount,
    wherein the first amount and the second amount are different.

10. The method of claim 9, wherein the first amount and the second amount are determined based on an amount by which the first area and the second area of the reconstructed frame differ from corresponding areas within an original frame encoded to produce the encoded frame.

11. The method of claim 8, wherein the changes to the one or more of the non-linearity selection filter parameter, the filter size parameter, or the directional sensitivity filter parameter are based on a visual perceptibility of data within the reconstructed frame.

12. The method of claim 11, wherein the visual perceptibility of the data within the reconstructed frame is analyzed using a psychovisual model, wherein the threshold is defined using the psychovisual model.

13. The method of claim 12, wherein changing the non-linearity selection filter parameter causes a preservation of certain types of the data within the reconstructed frame.

14. The method of claim 13, wherein the certain types of the data within the reconstructed frame are a first set of reconstructed frame data and remaining data within the reconstructed frame are a second set of reconstructed frame data, wherein the filtering of the reconstructed frame according to the adaptive quantization field data and using the changed one or more of the non-linearity selection filter parameter, the filter size parameter, or the directional sensitivity filter parameter is limited to the second set of reconstructed frame data.

15. A method for decoding an encoded frame, the method comprising:
   producing a reconstructed frame from the encoded frame;
   adjusting adaptive quantization field data for the encoded frame according to one or more details within the reconstructed frame; and
   controlling a filtering of the reconstructed frame using the adjusted adaptive quantization field data.

16. The method of claim 15, wherein controlling the filtering of the reconstructed frame using the adjusted adaptive quantization field data comprises:
   using the adaptive quantization field data to control one or both of a strength or a spatial size of a deblocking filter.

17. The method of claim 16, wherein the adaptive quantization field data indicates that a first area of the reconstructed frame was encoded using a first quantization value and that a second area of the reconstructed frame was encoded using a second quantization value, wherein the first quantization value is higher than the second quantization value,
   wherein using the adaptive quantization field data to control the one or both of the strength or the spatial size of the deblocking filter comprises:
      filtering the first area of the reconstructed frame using a first filter strength and the second area of the reconstructed frame using a second filter strength, wherein the first filter strength is stronger than the second filter strength.

18. The method of claim 15, further comprising:
   producing filtered data by filtering the reconstructed frame according to the adaptive quantization field data,
   wherein adjusting the adaptive quantization field data according to the one or more details within the reconstructed frame comprises:
      adjusting at least some of the adaptive quantization field data based on a number of blocking artifacts within the filtered data.

19. The method of claim 18, wherein adjusting the at least some of the adaptive quantization field data based on the number of blocking artifacts within the filtered data comprises:
   determining that the number of blocking artifacts within the filtered data exceeds a threshold defined using a psychovisual model which analyzes visually perceptible artifacts resulting from filtering.

20. The method of claim 15, wherein adjustments to the adaptive quantization field data are limited by an error level definition representing a maximum quantization error for the reconstructed frame.

* * * * *